United States Patent [19]
Zubeck

[11] Patent Number: 5,299,855
[45] Date of Patent: Apr. 5, 1994

[54] CHILD SEAT RESTRAINT APPARATUS

[76] Inventor: Michael J. Zubeck, P.O. Box 1667, Pinetop, Ariz. 85935

[21] Appl. No.: 981,546

[22] Filed: Nov. 25, 1992

[51] Int. Cl.$^5$ .............................................. A44B 11/25
[52] U.S. Cl. ..................................... 297/485; 297/467
[58] Field of Search ............ 297/467, 468, 469, 464, 297/473, 475, 484, 485

[56] References Cited

U.S. PATENT DOCUMENTS

| | | | |
|---|---|---|---|
| 2,664,140 | 12/1953 | Kindelberger | 155/11 |
| 3,083,054 | 3/1963 | Weaver | 297/219 |
| 3,099,486 | 7/1963 | Scott | 297/389 |
| 3,158,399 | 11/1964 | Pragnell | 297/484 |
| 3,325,213 | 6/1967 | Levy | 297/484 X |
| 3,954,280 | 5/1976 | Roberts | 280/744 |
| 3,992,028 | 11/1976 | Abe et al. | 280/728 |
| 4,040,664 | 8/1977 | Tanaka et al. | 297/467 |
| 4,632,425 | 12/1986 | Barratt | 280/801 |
| 4,871,210 | 10/1989 | Alexander et al. | 297/435 |
| 4,874,203 | 10/1989 | Henley | 297/250 |
| 5,031,960 | 7/1991 | Day | 297/254 |
| 5,056,869 | 10/1991 | Morrison | 297/485 |
| 5,082,325 | 1/1992 | Sedlock | 297/485 X |
| 5,181,765 | 1/1993 | Glover | 297/467 |

Primary Examiner—Richard E. Moore
Attorney, Agent, or Firm—Laura J. Zeman; David G. Rosenbaum

[57] ABSTRACT

A compact and uncomplicated apparatus for safely restraining a child in an adult seat which is used during transportation, such as an automobile seat. The apparatus comprises a planar seat member designed to sit directly on top of the seat portion of an adult seat, a pair of safety straps attached to one end of the planar seat member which are pushed through the space between the seat and back portions of an adult seat and further pulled up and over the back portion of the adult seat, and a buckle or other means for connecting the pair of safety straps to the top surface of the planar seat member. When a child is placed in the apparatus, the straps cross the child's upper torso and connect to the planar seat member between the child's legs.

19 Claims, 3 Drawing Sheets

CHILD SEAT RESTRAINT APPARATUS

BACKGROUND OF THE INVENTION

The present invention relates generally to a child seat restraint apparatus. More particularly, the present invention relates to an apparatus for safely transporting children who are at an age where they are too big for car seats and too small for adult seat belt restraints.

Several child restraint devices currently exist for automobiles. However, none of the existing child restraints are specifically designed for children of ages two and up who are too large for infant car seats and too small for the adult seat belt restraints contained in automobiles and other vehicles of transportation. Furthermore, none of the existing car restraints are made of a limited number of components which are simple to install and further easily engage and secure a child with a minimum number of straps and minimal effort on the part of an adult assisting the child.

For example, U.S. Pat. No. 3,099,486, issued Jul. 30, 1963, discloses a safety car seat having a body sack which can be adjustably closed at the sides to accommodate different sized children and straps which extend from the sack to encircle the back of an automobile seat. When the seat is used, the child must be placed within the body sack and the body sack closures secured according to the size of the child. In addition, the straps extending from the body sack must be adjusted and secured around the back of a car seat and to a hanger draped over the back of the car seat. U.S. Pat. No. 3,954,280, issued May 4, 1976, discloses a child auto restraint harness which includes a crotch strap, a pair of waist straps, a rigid strap plate for holding a plurality of straps, an anchor strap, and adjustable shoulder straps. In use, the anchor strap is threaded through the rigid strap plate and passed under a clasped seat belt on the seat of the automobile and through the crack between the seat and back portions of the automobile seat thereby encircling the back of the seat. This car restraint requires an adult to manipulate the child and the straps such that the child is adequately and properly secured. Such manipulation proves to be cumbersome and difficult in that a number of straps, including the crotch, waist, anchor and shoulder straps, must be properly positioned before it is safe to travel.

U.S. Pat. No. 4,632,425, issued Dec. 30, 1986, discloses a passenger restraint system having a fabric envelope which fits snugly over a seat back, in particular the back of a bus seat, and seat belt type webbing stitched onto the envelope. However, this restraint involves a somewhat complicated installation in that some webbing segments are designed to attach to the seat frame which is hard to reach. A restraint vest is also disclosed which would require additional manipulation of the child in order to place the child within the vest. U.S. Pat. No. 5,031,960, issued Jul. 16, 1991, also discloses a vest for engaging the upper torso of a child.

There are also child car restraint devices which include a separate seat for the child which is further attached to the automobile seat. However, these type of restraints have cumbersome and bulky components which are not easily transported outside of the automobile. For instance, U.S. Pat. No. 2,664,140, issued Dec. 29, 1953, discloses a child's automobile seat having a chair connected to a frame by hinges where the frame is further attached to an automobile seat. In addition, U.S. Pat. No. 3,992,028, issued Nov. 16, 1976, discloses a child's seat which is hung on the back of an automobile seat and further secured to the seat by a strap which encircles the back of the seat.

Consequently, there are no available child car restraints with shoulder harnesses which are compact and uncomplicated, easy to install, and easy to transport. Furthermore, there is a need for child restraint devices which are adaptable for other methods of travel in addition to the automobile, such as airplanes, buses, and trains.

SUMMARY OF THE INVENTION

Accordingly, it is a principal object of the present invention to provide a new and safe child restraint apparatus for transporting children in automobiles.

It is a further object of the present invention to provide a new and safe automobile restraint apparatus for those children who are too large in size for a car seat and too small in size for adult seat belts.

It is still a further object of the present invention to provide a compact and uncomplicated child car restraint apparatus which is easy to transport and easy to install.

It is yet a further object of the present invention to provide a child car restraint apparatus in which a child is easily seated and secured with a minimal amount of manipulation.

It is still a further object of the present invention to provide a child car restraint apparatus which is easily adapted for use with other modes of transportation such as airplanes, buses, and trains.

In brief, there is provided a child restraint apparatus which includes a planar seat member with a strap. Both ends of the strap are connected to the posterior end of the planar seat member after the strap is threaded through a clasp member. The clasp member and strap are pushed through the space between the seat and back portions of an adult seat used during transportation, such as an automobile seat, and then wrapped around the back of the adult seat such that a pair of straps are formed which encircle the back portion of the adult seat. The clasp member is then connected to the top of the planar seat member, which rests on top of the seat portion of an adult seat. In addition, the length of the straps may be adjusted to accommodate varying seat heights In another embodiment of the present invention, a back support panel is included which serves as an intermediate connection piece between the ends of the strap, which were connected to the posterior end of the planar seat member, and the planar seat member itself. In this embodiment, the planar seat member is attached to the back support panel which is further attached to the ends of the restraining strap. The restraining strap forms a pair of straps which encircle the back portion of an adult seat and are then connected to the top of the planar seat member as previously indicated.

The objects and advantages of this invention will appear more fully from the following more detailed description of the preferred embodiments of the invention made in conjunction with the accompanying drawings.

DETAILED DESCRIPTION OF THE PREFERRED EMBODIMENTS

Figure 1:
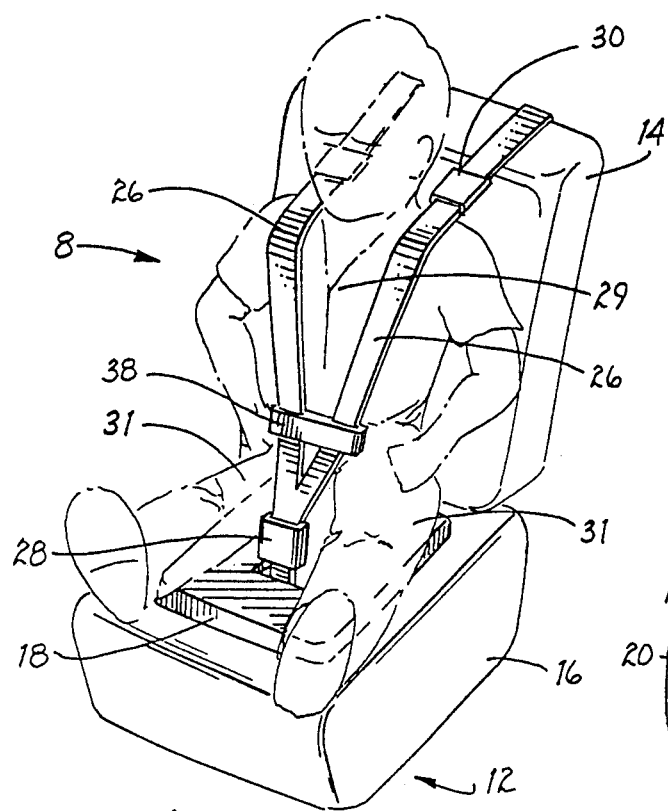
FIG. 1 is a perspective view of a first preferred embodiment of the child restraint apparatus in accordance with the present invention shown mounted on a front automobile seat with a child secured therein.
Figure 2:
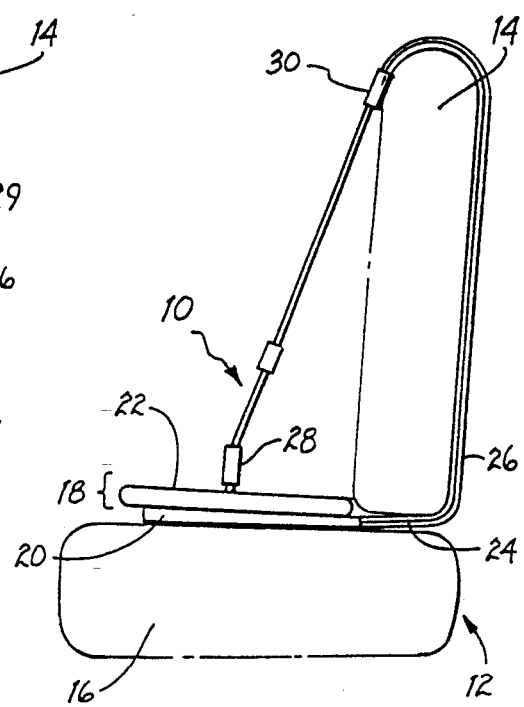
FIG. 2 is a side elevational view of the first preferred embodiment of the child restraint apparatus according to the present invention shown mounted on a front automobile seat.

In accordance with a first preferred embodiment of the present invention, FIG. 1 illustrates a perspective view of a child 8 secured in the child restraint apparatus 10 which is mounted to an automobile seat 12, while FIG. 2 shows a side elevational view of the child restraint apparatus 10 shown mounted to the automobile seat without the child. The automobile seat 12 comprises a back portion 14 and a seat portion 16. Generally, the child restraint apparatus 10 consists of a planar seat member 18 having a base 20, a pad 22 and flanges 24 protruding from one end of the planar seat member 18, a strap 26 having first and second ends which are connected to the flanges 24, and a means for connecting a middle portion of the strap 26 to the top surface of the planar seat member 18, such as a buckle 28.

The strap 26 is threaded through the buckle 28 so that the strap 26 will form a pair of shoulder harnesses when wrapped around the back portion 14 of the automobile seat 12 and the upper torso 29 of the child 8. Furthermore, each of the shoulder harnesses are provided with a plate member 30 which allows the ends of the strap 26 to be doubled thereby permitting the shoulder harnesses to increase or decrease in length.

In use, the planar seat member 18 is placed directly on top of the seat portion 16 of the airline seat 12 and the ends of the strap 26 are attached to the flanges 24, both of which are pushed through the opening between the back portion 14 and the seat portion 16 of the automobile seat 12. The strap 26 is shoved all the way through the opening so that the flanges 24 are positioned within the opening between the back portion 14 and the seat portion 16 of the automobile seat 12. A child 8 is then placed onto the planar seat member 18, with the child's legs 31 straddling the buckle 28, while the strap 26 is wrapped around the back portion 14 of the airline seat 12 and over the upper torso 29 of the child 8, and then connected to the planar seat member 18 by the buckle 28. The means for adjusting the shoulder harnesses to accommodate varying seat heights is discussed later with reference to FIG. 4.

Figure 3:
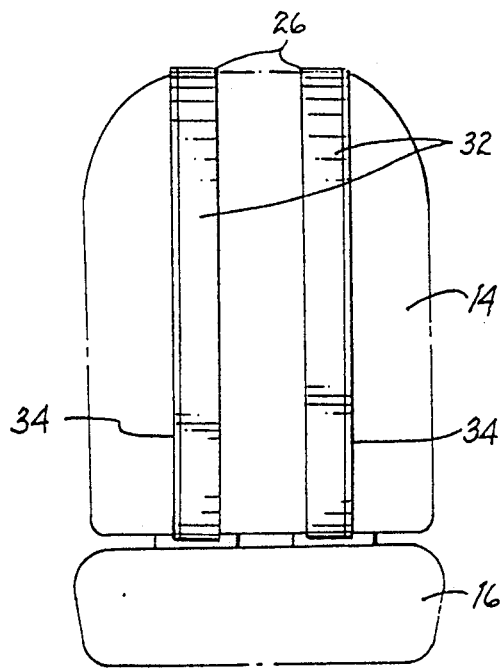
FIG. 3 is a back elevational view of the first preferred embodiment of the child restraint apparatus shown mounted on a front automobile seat.

With reference to FIG. 3, which shows a back elevational view of the first preferred embodiment of the present invention mounted on an adult seat, there is shown a pair of shoulder harnesses which are comprised from a strap 26 whose ends have been doubled in order to decrease the length of the shoulder harnesses. This doubling of the ends of the strap 26 is exemplified by the showing of the outer surface 32 and the inner surface 34 which comprise the strap 26. During the use of the child restraint apparatus 10, the strap 26 encircles the back portion 14 of the automobile seat thereby creating the pair of shoulder harnesses for securing a child.

Figure 4:
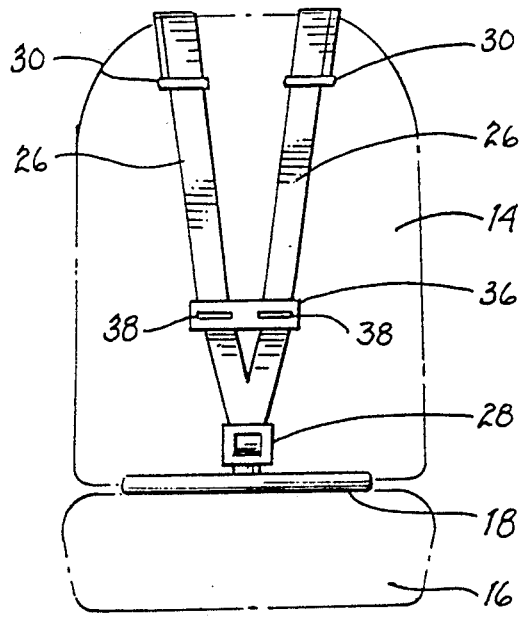
FIG. 4 is a front elevational view of the first preferred embodiment of the child restraint apparatus shown mounted to a front automobile seat.

FIG. 4 illustrates a front elevational view of the first preferred embodiment of the present invention mounted on an adult seat. A middle portion of the strap 26 of the child restraint apparatus 10 is attached to the planar seat member 18 by means of a buckle 28. A plate member 30 having at least one slit (not shown) is attached to each end of the strap 30 with each end of the strap 26 further passing through the slits (not shown) of their respective plate members 30. Pulling a length of the strap 26 through the slits (not shown) of the plate members 30 results in the doubling of the ends of the strap 26 and the shortening of the shoulder harnesses in length. This means for shortening the straps 26 is similar to the means which was used to adjust the length of standard automobile seat belts before the belts were attached to devices which enabled the automatic retraction of the belts.

In addition, the child restraint apparatus 10 includes a means for adjusting the distance between the shoulder harnesses near the strap's 26 attachment to the top of the planar seat member 18 by providing a second plate member 36. The second plate member 36 contains at least two slits 38 through which the shoulder harnesses of the child restraint apparatus 10 are threaded. The up and down movement of the second plate member 38 serves to adjust the shoulder harnesses of the child restraint device 10 to accommodate children of varying sizes. In use, upon fastening or buckling the middle portion of the strap 26 to the top of the planar seat member 18, the head of a child occupying the child restraint apparatus 10 should be located above the second planar member 38 and the legs of the child should straddle the buckle such that the straps form a generally "V"-shape across the upper torso of the child's body. (See FIG. 1)

Figure 5:
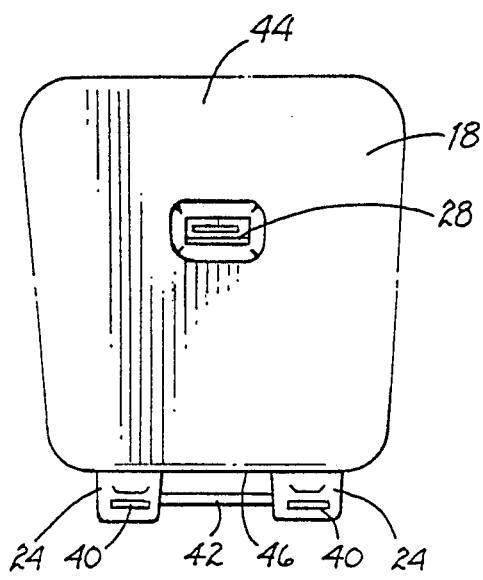
FIG. 5 is a top elevational view of the seat portion of the first preferred embodiment of the child restraint apparatus.

With reference to FIG. 5, there is illustrated a top elevational view of the planar seat member 18 of the child restraint apparatus 10. The planar seat member 18 comprises at least two flanges 24 each having at least one slit 40 that passes through each flange 24 and a means for connecting a middle portion of the strap 26 of the child restraint apparatus 10 to the planar seat member 18, such as the buckle 28 shown in FIGS. 1, 3, and 4. The ends of the strap 26 of the child restraint apparatus 10 are connected to the planar seat member 18 by being passed through the slits 40 in the flanges 24 and then fastened anywhere along the length of the strap 26. Additionally, a rod 42 may also be supplied which is positioned between, and fastened to, the flanges 40 in order to provide a carrying handle for transporting the apparatus from one vehicle of transportation to another. The preferred dimensions for the planar seat member 18 are approximately twelve inches for length, twelve inches for width at the front end 44 of the planar seat member 18, and ten inches for width at the back end 46 of the planar seat member 18.

Figure 6:
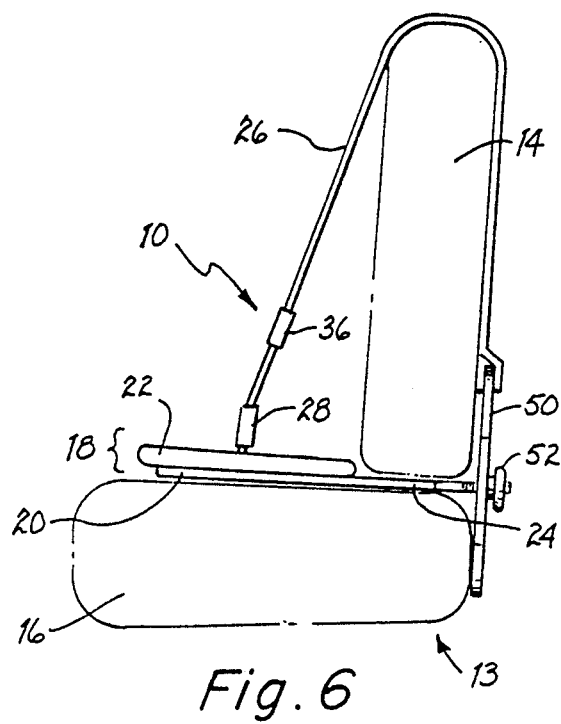
FIG. 6 is a side elevational view of a second preferred embodiment of the child restraint apparatus according to the present invention shown mounted on a front automobile seat.
Figure 7:
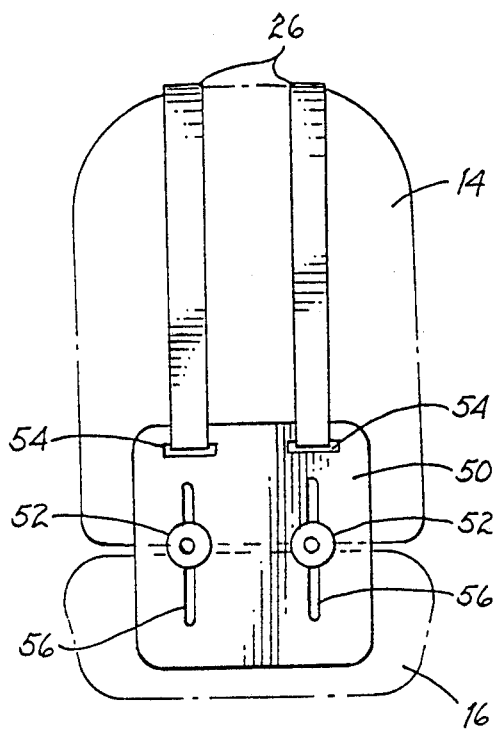
FIG. 7 is a back elevational view of the second preferred embodiment of the child restraint device shown mounted on a front automobile seat.

FIGS. 6–7 depict a second preferred embodiment of the child restraint apparatus 10 mounted to an automobile seat 13. Like the first preferred embodiment previously described, the second preferred embodiment of the child restraint apparatus 10 comprises a planar seat member 18 having a base 20, a pad 22 and flanges 24 protruding from one end of the planar seat member 18, a strap 26, and means for connecting a middle portion of the strap 26 to the top surface of the planar seat member 18, such as a buckle 28. However, the flanges 24 of the second preferred embodiment shown in FIG. 5 extend beyond the back portion 14 of the automobile seat 13 to facilitate their connection to a back panel support 50 which is further secured by knobs 52. The back panel support 50 contained in the second preferred embodiment of the child restraint apparatus 10 is also connected to the ends of the strap 26. In effect, the back support panel 50 functions as an intermediate connecting piece between the ends of the strap 26 and the flanges 24 of the planar seat member 18.

As illustrated in FIG. 7, the back support panel 50 has at least two horizontal slits, which are used to connect the ends of the strap 26 of the child restraint apparatus 10 to the back support panel 50, and at least two vertical slits 56, which are used to connect the flanges 24 of the planar seat member 18 to the back support panel 50. The vertical slits 56 function to adjust the length of the strap 26, and thereby the shoulder harnesses, by sliding the flanges 24 up or down once the flanges 24 are placed through the vertical slits 56. Removable knobs 52 serve to anchor the flanges 24 once they are positioned within the vertical slits 56 In use, the back support panel 50 is positioned over a part of both the back portion 14 and seat portion 16 of the automobile seat 13

Figure 8:
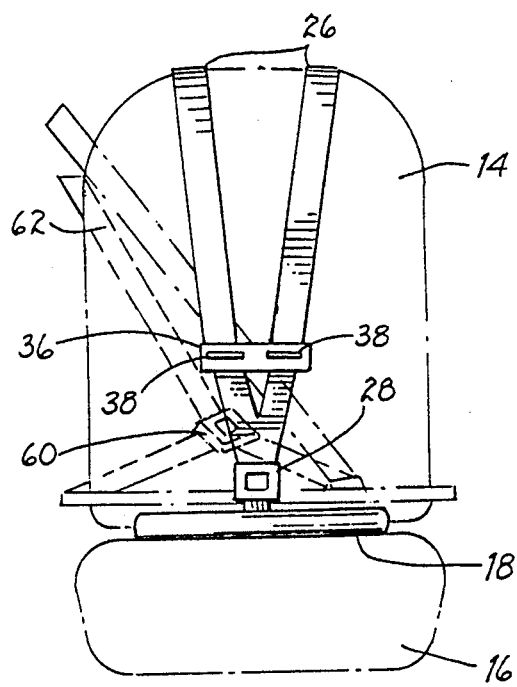
FIG. 8 is a front elevational view of the second preferred embodiment of the child restraint device shown mounted on a front automobile seat.

FIG. 8 shows a front elevational view of the second preferred embodiment of the child restraint apparatus 10 with a middle portion of the strap 26 of the child restraint apparatus 10 connected to the top surface of the planar seat member 18 by a buckle 28. Like the first preferred embodiment, this embodiment includes a second plate member 36 with slits 38 which functions to adjust the strap 26, and thereby the shoulder harnesses, of the child restraint device 10 to accommodate varying seat adult seat heights. The child restraint apparatus 10 shown in FIG. 7 also includes a clip means 60 which is attached to the strap 26, and thereby the shoulder harnesses, of the child restraint apparatus 10. Because it is suggested that the inventive child restraint apparatus 10 be used along with existing adult seat belt restraints 62, the clip means 60 functions to adjust the position of the adult seat belt restraints 62, in particular the shoulder belt, by clipping the adult seat belt restraints 62 to the strap 26 of the inventive child restraint apparatus and thereby moving the position of the adult seat belt restraints 62 to a lower and more appropriate position in relation to a child. The clip means 60 is designed to be used with all of the preferred embodiments of the child restraint apparatus 10.

Figures 9, 10:
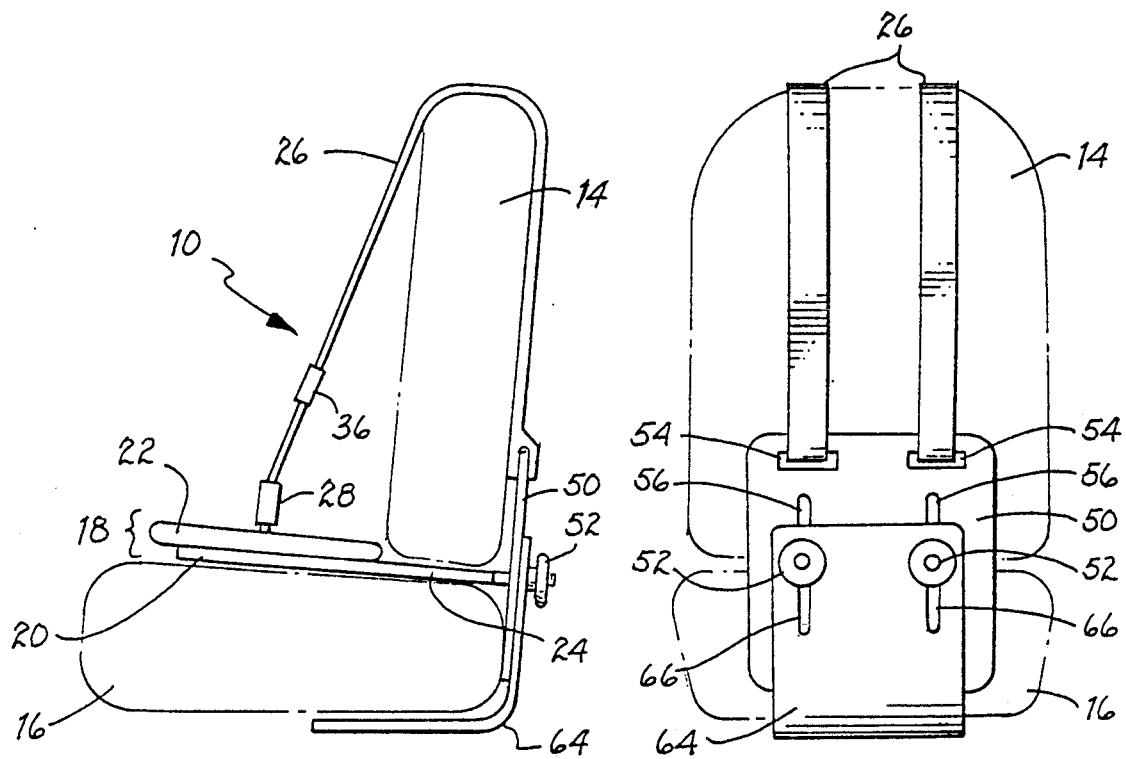
FIG. 9 is a side elevational view of a third preferred embodiment of the child restraint device shown mounted to a front automobile seat.
FIG. 10 is a back elevational view of the third preferred embodiment of the child seat restraint device in accordance with the present invention.

A third preferred embodiment of the child restraint apparatus 10 shown mounted to an automobile seat 12 is illustrated in FIG. 9. The third preferred embodiment of the child restraint apparatus 10 is identical to the second preferred embodiment of the child restraint apparatus 10 with one exception, that exception being the addition of a curved seat brace 64 which is connected to the back support panel 50. The curved seat brace 64 provides additional means for securing the child restraint apparatus 10 to the automobile seat 12 by hooking under the seat portion 16 of the automobile seat 12.

As illustrated in FIG. 10, the curved seat brace 64 has a pair of vertical slits 66 which align with the two vertical slits 56 of the back panel support 50 when the third embodiment of the child seat restraint device 10 is employed The flanges 24 of the planar seat member 18 are inserted through both the two vertical slits 56 of the back panel support 50 and the pair of vertical slits 66 in the curved seat brace 64, and then secured with removable knobs 52 or other suitable means in order to fasten the child seat restraint device 10 to the adult automobile seat 12.

Although the previously described embodiments of the present invention have all referred to a single strap 26 which is used to form shoulder harnesses for securing a child within the child restraint apparatus 10, the child restraint apparatus 10 may also comprise two separate and distinct straps which are attached at the buckle 28 to form shoulder harnesses.

Preferred materials for use in accordance with this invention are a metal or hard plastic for the base 20 of the planar seat member 18, the back panel support 50, the plate members 30, the second plate member 38, the buckle 28, and the curved seat brace 64. The straps 26 of the child restraint apparatus 10 are preferably made of a tightly woven nylon like that used for automobile safety belts.

While the invention has been described and disclosed with reference to the preferred embodiments thereof, those skilled in the art will understand and appreciate that variations in the basic design or substitution of materials may be made, but still fall within the intended scope of the invention, which is to be limited only by the claims appended hereto.

I claim:

1. A child restraint apparatus comprising:
   a planar seat member;
   at least one strap, having first and second ends thereof, said first and second ends of said at least one strap being connected to said planar seat member; and
   means for attaching a middle portion of said at least one strap to said planar seat member such that said at least one strap forms a pair of shoulder harnesses which encircle the back of an adult seat used during transportation.

2. The apparatus of claim 1 further comprising a means for adjusting the length of each of said pair of shoulder harnesses.

3. The apparatus of claim 2 further comprising spacer means for maintaining a lateral separation distance between said pair of shoulder harnesses near said middle portion of said at least one strap.

4. The apparatus of claim 3 wherein said pair of shoulder harnesses form a "V"-shape below the head and across the upper torso of a child placed in said child restraint apparatus.

5. The apparatus of claim 4 further comprising clip means attached to said pair of shoulder harnesses for adjusting the position of an adult seat belt when said adult seat belt is used in conjunction with said child restraint apparatus.

6. The apparatus according to claim 5 wherein said means for attaching a middle portion of said at least one strap to said planar seat member comprises a clasp and tongue member.

7. The apparatus according to claim 6 wherein said planar seat member further comprises two flanges attached to a posterior end of said planar seat member, each of said flanges having a slit through which each of said first and second ends of said at least one strap passes to connect said pair of straps to said planar seat member.

8. The apparatus according to claim 7 wherein said planar seat member further includes a handle comprising a rod member located between and attached to each of said two flanges.

9. The apparatus according to claim 4 further comprising a back panel support, said back panel support providing means for connecting said first and second ends of said at least one strap to said planar seat member.

10. The apparatus of claim 9 wherein said back panel support comprises means for attaching said first and second ends of said at least one strap and at least two vertical slits for attaching said planar seat member to said back panel support.

11. The apparatus of claim 10 wherein said planar seat member comprises at least two flanges designed to fit through said vertical slits in said back panel support and means for securing said at least two flanges in place after being fitted through said vertical slits.

12. The apparatus of claim 11 further comprising a curved seat brace having a pair of vertical slits which are aligned with said at least two vertical slits of said back panel support and secured thereto such that a portion of said curved seat brace is secured underneath said adult seat.

13. A child restraint apparatus comprising:
a planar seat member having at least two flanges connected to a posterior end of said planar seat member;
at least one strap having first and second ends thereof, each of said first and second ends of said at least one strap being connected to one of said at least two flanges of said planar seat member;
means for connecting a middle portion of said at least one strap to a top surface of said planar seat member such that said at least one strap forms a pair of shoulder harnesses which encircle the back of an adult seat used during transportation;
a plate member having at least two slots for each of said pair of shoulder harnesses to pass through one of said at least two slots; said plate member being located near said middle portion of said at least one strap; and
clip means attached to said at least one strap for adjusting the position of an adult seat belt when said adult seat belt is used in conjunction with said child restraint apparatus.

14. The apparatus according to claim 13 wherein each of said pair of shoulder straps is adjustable in length.

15. The apparatus according to claim 14 wherein said means for connecting a middle portion of said at least one strap to a top surface of said planar seat member comprises a clasp and a tongue member.

16. The apparatus according to claim 15 wherein said planar seat member further includes a handle comprising a rod member located between and attached to each of said at least two flanges.

17. A method for restraining a child in an adult seat during transportation comprising the steps of:
pushing restraining straps attached to a seat member through an opening between a back portion and a seat portion of an adult seat used during transportation;
placing a child on said seat member;
encircling said back portion of said adult seat with said restraining straps wherein said restraining straps also cross the upper torso of said child; and
connecting said restraining straps to said seat member between the legs of said child.

18. The method according to claim 17 further comprising the step of adjusting the length of said restraining straps.

19. The method according to claim 18 further comprising the step the adjusting said restraining straps with a plate member such that said restraining straps form a "V"-shape across the upper torso of said child.

* * * * *